United States Patent
Huang

(10) Patent No.: US 6,892,379 B2
(45) Date of Patent: May 10, 2005

(54) METHODS AND APPARATUS FOR USE IN AIDING STACK UNWINDING

(75) Inventor: Alfred J. Huang, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 641 days.

(21) Appl. No.: 09/886,003

(22) Filed: Jun. 20, 2001

(65) Prior Publication Data

US 2004/0205741 A1 Oct. 14, 2004

Related U.S. Application Data

(60) Provisional application No. 60/291,420, filed on May 16, 2001.

(51) Int. Cl.[7] ................................................. G06F 9/45
(52) U.S. Cl. ........................ 717/140; 717/140; 717/141; 717/142; 717/143; 717/124; 717/125; 717/158; 712/202
(58) Field of Search ................................ 717/140–143, 717/120–128, 153, 158, 162, 129, 155; 714/32; 703/27, 20; 718/101; 719/331; 712/244

(56) References Cited

U.S. PATENT DOCUMENTS

| | | | | |
|---|---|---|---|---|
| 4,951,195 A | * | 8/1990 | Fogg et al. ................. 703/20 |
| 5,005,119 A | * | 4/1991 | Rumbaugh et al. ......... 718/101 |
| 5,175,828 A | * | 12/1992 | Hall et al. ................. 719/331 |
| 5,628,016 A | * | 5/1997 | Kukol ........................ 717/140 |
| 6,014,515 A | * | 1/2000 | Burch ........................ 717/129 |
| 6,014,517 A | * | 1/2000 | Shagam et al. ............ 717/142 |
| 6,106,574 A | * | 8/2000 | Baisley et al. ............. 717/140 |
| 6,112,312 A | * | 8/2000 | Parker et al. .............. 714/32 |
| 6,219,828 B1 | * | 4/2001 | Lee .......................... 717/129 |
| 6,243,668 B1 | * | 6/2001 | Le et al. .................... 703/27 |
| 6,249,906 B1 | * | 6/2001 | Levine et al. .............. 717/153 |
| 6,289,446 B1 | * | 9/2001 | Nilsson ..................... 712/244 |
| 6,293,712 B1 | * | 9/2001 | Coutant .................... 717/155 |
| 6,314,564 B1 | * | 11/2001 | Charles et al. ............ 717/162 |
| 6,470,493 B1 | * | 10/2002 | Smith et al. ............... 717/130 |
| 6,513,155 B1 | * | 1/2003 | Alexander et al. ......... 717/124 |
| 6,550,058 B1 | * | 4/2003 | Wynn ....................... 717/158 |
| 6,553,564 B1 | * | 4/2003 | Alexander et al. ......... 717/128 |
| 6,728,955 B1 | * | 4/2004 | Berry et al. ............... 717/158 |
| 6,732,357 B1 | * | 5/2004 | Berry et al. ............... 717/158 |

OTHER PUBLICATIONS

Merrick, Early Unwindings and Rollovers of Stock Index Futures Arbitrage Programs: Analysis and Implications for Predicting Expiration Day Effects; Introduction, The Journal of Futures Markets, Apr. 1989. vol. 9, Iss. 2; p. 101 (11 pages).*

Internet, Unwinding The Stack, http://c2.com/cgi/wiki?UnwindingTheStack.*

(Continued)

*Primary Examiner*—Anil Khatri
*Assistant Examiner*—Satish S. Rampuria
(74) *Attorney, Agent, or Firm*—Beyer Weave & Thomas LLP

(57) ABSTRACT

In a compiler, a method of generating assembly code for stack unwinding is disclosed. One or more source code lines are obtained. Assembly code for the one or more source code lines is then generated. The assembly code includes one or more stack unwind assembler having one or more associated stack unwind sub directives. Each of the stack unwind assembler directives is adapted for indicating to an assembler that one or more encoded data sections containing stack information to be used for stack unwinding is to be generated in an object file from the one or more associated stack unwind sub directives.

32 Claims, 4 Drawing Sheets

OTHER PUBLICATIONS

Wong et al., Execption Handling in C++ Without Language Extension, 1993, IEEE, pp. 411–414.*

Wong et al., Exception handling in C++ without language extension, Oct. 1993, IEEE, vol. 1, p. 411–414.*

Haenni, A structure macro assembler for the event handler, Oct. 1989, IEEE, vol. 36, p. 1685–1689.*

Champlain et al., A reflective architecture for cross–assembler, 1999, IEEE, p. 346–348.*

Shouzhong et al., Building knowledge–based systems with an assembling technique, Mar./Apr. 1997, IEEE, p. 81–83.*

Intel, "*IA–64 Software Conventions and Runtime Architecture Guide,*" Doc. No. 245358–002, Sep. 2000.

Intel, "*Intel® Itamium™ Architecture Assembly Language Reference Guide,*" Doc. No. 248801–003 http://developer.intel.com, Oct. 2000.

* cited by examiner

METHODS AND APPARATUS FOR USE IN AIDING STACK UNWINDING

CROSS-REFERENCE TO RELATED APPLICATIONS

This application claims priority of U.S. Provisional Application No. 60/291,420, entitled "Methods and Apparatus for Use in Aiding Stack Unwinding," filed on May 16, 2001, which is hereby incorporated by reference for all purposes.

BACKGROUND OF THE INVENTION

1. Field of the Invention

The present invention relates generally to computer software. More particularly, the present invention relates to methods and apparatus for providing a mechanism for use in aiding stack unwinding.

2. Description of the Related Art

A conventional software process from the compilation through the debugging process is illustrated in FIG. 1. As shown at block 102, source code is received by a compiler 102. The compiler 102 processes statements written in a particular programming language. The compiler 102 may either produce machine-readable code (e.g., object code) or assembly code for input to an assembler 104. Of course, it is possible for a human to generate assembly code directly without the assistance of a compiler.

When the assembler 104 receives the assembly code, it converts the assembly code into object code. One or more object code files may then linked by a linker 107 to generate an executable file 108. The executable file 108 may then be loaded into memory and run, or the executable file 108 may be debugged using a debugger 106. For instance, a debugger may enable a computer programmer to step through the object code or perform "call tracing." When the object code is ultimately executed, an exception handler 108 may be called during execution of the object code when an exception trap occurs.

During execution of the object code, a run time stack is used to store data for the called functions. More particularly, a stack is a push-down list. In other words, when a new function is called, data for that function are pushed onto the stack, pushing down the stack entries. Conversely, when a program accesses an item from a stack, the program always takes its next item to handle from the top of the stack. Thus, function data are pushed onto the stack, and popped from the stack as necessary.

In order to perform various processes, such as debugging (e.g., call tracing) and exception handling, the stack must be at least partially "unwound." In other words, data of a previous function in the call chain on the stack may need to be recalled. For example, exception handling or call tracing (e.g., back tracing) must perform some stack unwinding to access data that were previously pushed onto the stack.

In view of the above, there is a need to devise methods and apparatus for providing a human readable mechanism for enabling easy access to the pushed function data during stack unwinding.

SUMMARY

The present invention enables a compiler or an assembly language programmer to provide human readable indicators in an assembly file to indicate the status of function data during stack unwinding. This is accomplished, in part, through the generation of assembler directives. These assembler directives may be interpreted by its corresponding assembler to produce unwind information.

In accordance with one aspect of the invention, a method of generating assembly code for stack unwinding is disclosed. One or more source code lines are obtained. Assembly code for the one or more source code lines is then generated. The assembly code includes one or more stack unwind assembler directives having one or more associated stack unwind sub directives. Each of the stack unwind assembler directives is adapted for indicating to an assembler to record the stack activity as specified by the stack unwind sub-directives. The recorded information will be used later by a stack unwinder to perform stack unwinding. In other words, the stack unwind sub directives may indicate one or more stack operations that were previously performed that require reversal. Alternatively, the stack unwind sub directives may indicate one or more stack unwind operations to be performed such that the stack is "unwound."

Once the assembly code is generated, an assembler may interpret the unwind directives and save the function data in an encoded data section for use by a stack unwinder. In this manner, data previously pushed onto the stack may be recalled. Thus, through the use of assembler directives and sub directives, a compiler writer and assembly programmer need not be knowledgeable about the details of the encoded unwind information. Thus, only the assembler writer needs to be knowledgeable with respect to the details of the stack unwind object code encoding.

BRIEF DESCRIPTION OF THE DRAWINGS

The invention, together with further advantages thereof, may best be understood by reference to the following description taken in conjunction with the following figures.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The present invention enables assembler directives for performing stack unwinding to be generated. More particularly, stack unwinding involves reversing one or more previously performed stack operations. Through the use of such assembler directives, a compiler writer and assembly programmer need not be knowledgeable about the details of the encoded stack information for unwinding. Thus, only the assembler writer needs to be knowledgeable with respect to the details of the stack unwind object code encoding. The present invention may be applicable in concept to a variety of assemblers including, but not limited to, the IA64 Assembler and IA64 object code.

Figure 1:
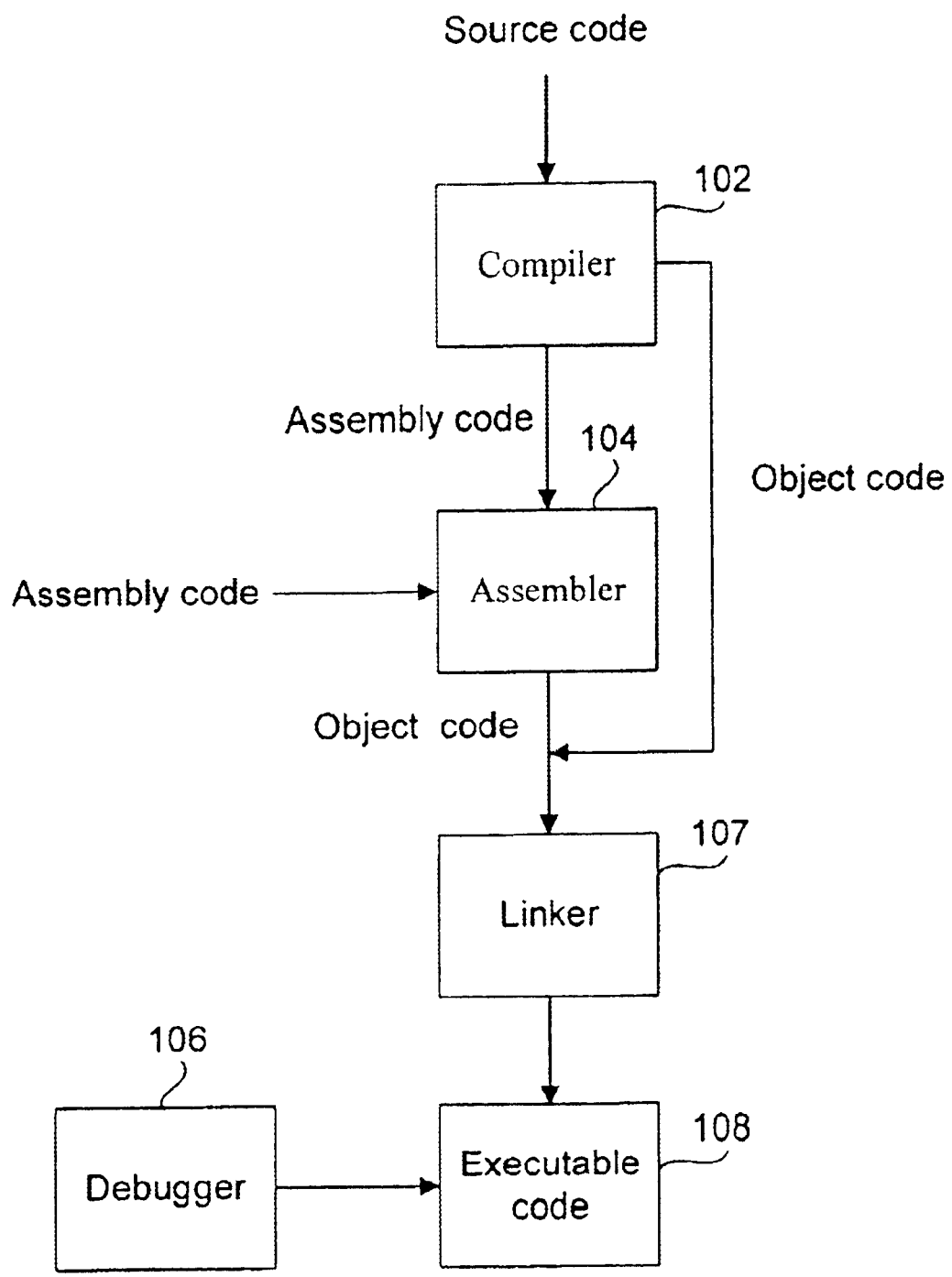
FIG. 1 is a process flow diagram illustrating a conventional software process.
Figure 2:
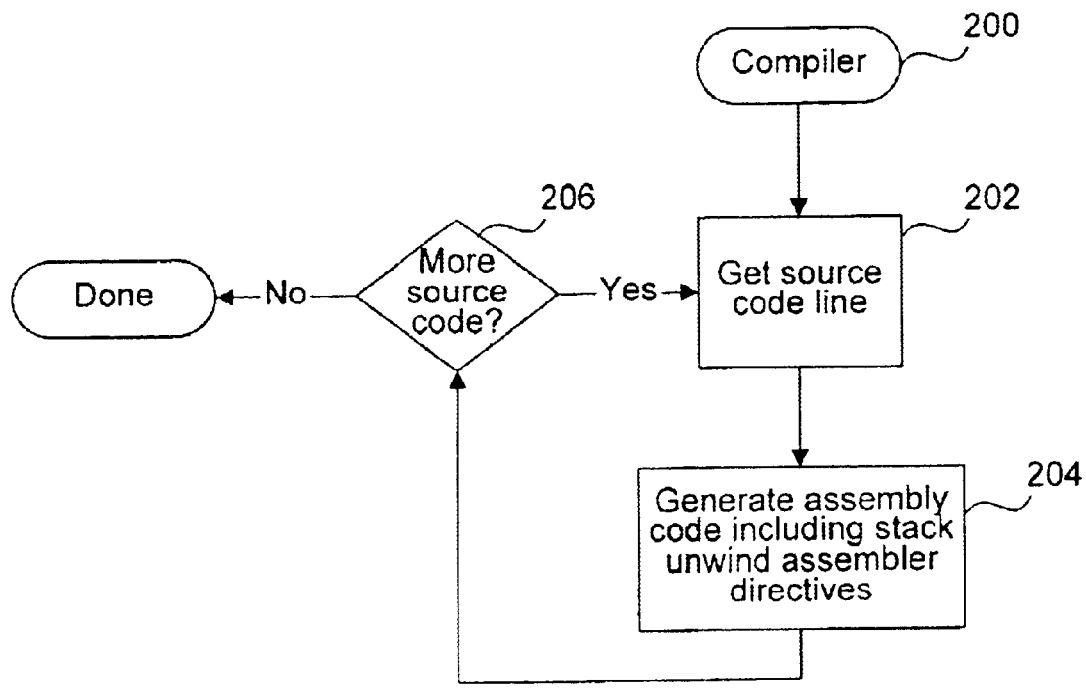
FIG. 2 is a process flow diagram illustrating a method of compiling source code to generate assembly code including stack unwind assembler directives in accordance with one embodiment of the invention.

FIG. 2 is a process flow diagram illustrating a method of compiling source code to generate assembly code including stack unwind assembler directives in accordance with one embodiment of the invention. In accordance with the present invention, the compiler obtains a source code line at block 202 and generates assembly code including stack unwind assembler directives at block 204. The process continues for remaining source code lines as shown at block 206.

In order to generate assembly code, the compiler obtains information from the source code line. The information obtained from the source code line will vary with the operation (e.g., function) to be performed. This information obtained from the source code line is then used to generate an assembler stack unwind directive, as appropriate. More specifically, in accordance with one embodiment, a stack unwind directive (e.g., ".unwindinfo") is generated to indicate that the assembler directive is a stack unwind directive. In other words, the use of a stack unwind indicator (e.g., "unwindinfo") indicates to an assembler that stack data is to be generated from an associated stack unwind subdirective. More specifically, an appropriate stack unwind subdirective (e.g., function name) indicating the specific stack unwind subdirective (e.g., operation to be performed) is generated. The sub directive may indicate an operation that is to be performed to "unwind" the stack. Alternatively, the sub directive may indicate an operation previously performed on the stack that is to be reversed or "unwound." An assembler receiving this stack unwind subdirective may then generate the appropriate encodings in a special data section to be used by a stack unwinder.

Figure 3:
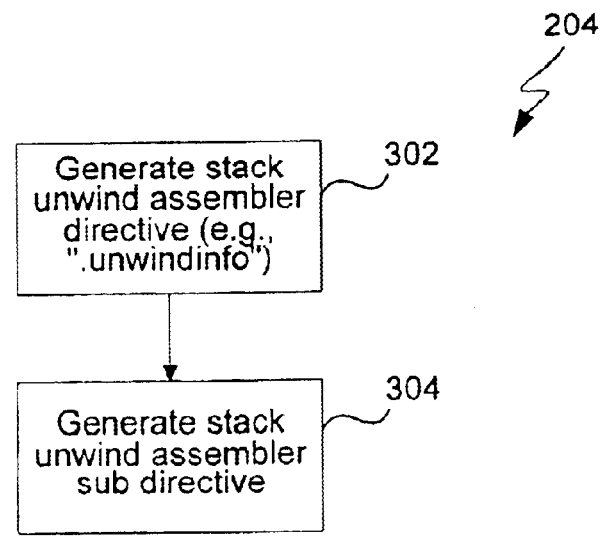
FIG. 3 is a process flow diagram illustrating a method of generating assembly code including stack unwind assembler directives as shown at block 204 of FIG. 2 in accordance with one embodiment of the invention.

FIG. 3 is a process flow diagram illustrating a method of generating assembly code including stack unwind assembler directives as shown at block 204 of FIG. 2 in accordance with one embodiment of the invention. As shown, at block 302 a stack unwind directive or indicator (e.g., ".unwindinfo") is generated to indicate that the assembler directive is a stack unwind directive. Next, at block 304 an appropriate stack unwind subdirective is generated corresponding to the appropriate stack unwind operation to be performed.

Illustrations of pseudo-code and associated stack unwind subdirectives will be described in further detail below.
Pseudo Code for Stack Unwind Directive and Subdirectives In order to illustrate how stack unwind sub directives are composed and generated during compilation, exemplary pseudo code is illustrated below. This pseudo code generally illustrates in a simplified format various types of unwind sub directives that can be generated. In addition, the pseudo code illustrates various exemplary categories of sub directives as well as specific sub directives that may be implemented through the application of the present invention.

As will be described below, non-terminal pseudo-ops (pseudo-ops defined by further pseudo-ops) are designated by upper case letters while terminal pseudo-ops are designated by bold face, lower case letters. Optional pseudo-ops are designated by brackets [ ]. Choices are separated by "|". Descriptive material is enclosed with < >.

---

PSEUDO_OP :: .unwindinfo SUB_OPS
SUB_OPS :: REGION_OP|SP_OP|SAVE_OP|SPILL_OP
REGION_OP :: P_REGION|B_REGION
P_REGION :: prologue [ <funct_name > SHORT_FORM ] begin|
    prologue end [ LABEL_MARKING ]
SHORT_FORM :: mask= < 0 to 15 > REG
LABEL_MARKING :: label_state=NUM|copy_state=NUM
B_REGION :: body BRACKET
BRACKET :: begin|
    end ecount=NUM [LABEL_MARKING]
SP_OP :: FIXED_STACK|VARIABLE_STACK
FIXED_STACK :: sp_set size=NUM
VARIABLE_STACK :: sp_save REG|sp_restore
SAVE_OP :: save FROM_REG INTO
FROM_REG :: psp|pfs|rp|preds|unat|lc|fp|sr|priunat|bsp|
    bspstore|rnat
INTO :: REG|pspoff=NUM|spoff=NUM
SPILL_OP :: SPILL_BASE_OP|SPILL_TO_MEM|SPILL_TO_REGS
SPILL_BASE_OP :: spill spillbase=NUM
SPILL_TO_MEM :: spill SOURCE_REG_1
SOURCE_REG_1 :: bNUM|fNUM|rNUM
SPILL_TO_REGS :: spill MASKS REG
MASKS :: gmask= < 0 TO 15 >|bmask= < 0 to 31 >
NUM:: < number greater than or equal to zero >
REG:: rNUM|< register aliases as accepted by the assembler >

---

As shown above, the general format for a stack unwind sub directive enables four different categories of SUB_OPS set forth above to be used as a sub-directive in combination with the stack unwind directive (e.g., ".unwindinfo"). More specifically, the four categories of SUB_OPS include REGION_OP indicating a region operation, SP_OP indicating a stack pointer operation, SAVE_OP indicating a save operation, and SPILL_OP indicating a spill operation.

First, the REGION_OP category sub directive designates (e.g., via label marking) different portions of functions (e.g., procedures or methods). In accordance with one embodiment of the invention, these portions include a prologue and a body. Thus, the REGION_OP may be a P_REGION designating a prologue region (e.g., via prologue . . . begin and prologue end statements) or a B_REGION designating a body region.

The prologue region prepares a function for stack operations that will be performed during execution of the function. Thus, the P_REGION sub directive designates the prologue of a function. The prologue may include a function name as well as a label associated with the prologue. More particularly, LABEL_MARKING may be used with the sub directive to mark nested functions within the sub directive. For example, a "label_state" indicator labels the current state for future reference. For instance, such an indicator may be used with a number to correspond to a nested function. As another example, a "copy_state" indicator indicates the state of a previously labeled body region to be copied to this body region. In this manner, a label is used to indicate the end of a section (e.g., body or prologue).

In addition, within the P_REGION subdirective, specific data and instructions may be pushed onto the stack or saved in one or more registers. As shown, SHORT_FORM designates a mask or bit vector indicating which registers have been saved. More specifically, a number from 0 to 15 is used to designate a bit vector, where each bit is associated with a different register. Through the specification of this bit vector, each bit indicates whether the associated register has been saved or not saved prior to the function call. For example, a 0 may be used to indicate that the register has not been saved, while a 1 may be used to indicate that the register has been saved. In this manner, encoding by the assembler from the stack unwind directives is optimized.

The body region includes operations that will be performed during execution of the function. Thus, the B_REGION sub directive indicates the begin and end of the body through LABEL_MARKING, as described above with respect to the prologue region. In addition, end ecount indicates the number of nested regions to be cleared (e.g., generated) in the epilogue code.

Second, the SP_OP category sub directive is used to indicate whether the stack is fixed or variable. In other words, the stack pointer operation may be used to indicate whether a function being called has a fixed number of arguments or a variable number of arguments. In this manner, a debugger ultimately accessing the stack may ascertain the number of arguments associated with a particular function. More particularly, a FIXED_STACK sub directive may be used to indicate the size of the stack (e.g., "sp set size") which indicates the number of entries in the stack. Similarly, a VARIABLE_STACK sub directive may be used to indicate that the size of the stack is variable. More specifically, the stack unwind sub directive indicates that the stack pointer is saved in a register such as prior to a function call (e.g., sp_save REG) or restored (e.g., sp_restore)

Third, the SAVE_OP category sub directive is used to indicate a source register or source memory location from which contents are to be obtained and a destination register or destination memory location to which the obtained contents (e.g., date) are to be saved or stored. One format that may be used is indicated by the pseudo-code "save FROM_REG INTO". As shown, data may be obtained from various registers such as IA64 specific registers listed. These registers include psp, pfs, rp, preds, unat, Ic, fpsr, priunat, bsp, bspstore, and rnat. The data obtained from one of these registers may then be saved into a register or memory location. The memory location may be specified or indicated through an offset, which may be a previous stack pointer offset (e.g., pspoff) or a stack pointer offset (e.g., spoff). In this manner, a displacement with reference to a memory stack may be specified.

Fourth, the SPILL_OP category sub directive is used to indicate a memory location or register to which information from a register is to be spilled. More particularly, similar to the SAVE_OP category sub directive, spilling is often performed to prevent information in a register from being overwritten (e.g., between function calls). For example spilling may be performed for special function, such as a variable argument function. In accordance with one embodiment of the invention, spilling may be performed for one or more registers simultaneously. More specifically, the memory location may be indicated relative to a stack pointer (SP) or previous stack pointer (PSP). As shown, SPILL_BASE_OP (e.g., spill spillbase=NUM) identifies a PSP relative offset to be used as the starting memory location for subsequent SPILL_TO_MEM operations. SPILL_TO_MEM enables spilling from a register to be performed from a register of type branch (e.g., bNUM), type floating point (e.g., fNUM), or general purpose (e.g., rNUM). SPILL_TO_REGS spills registers identified in a mask to registers starting from the specified register.

Exemplary Stack Unwind Directive and Subdirectives

The following are exemplary stack unwind directives followed by exemplary stack unwind sub directives.

.unwindinfo prologue func_name begin

This sub directive designates the beginning of the prologue of function "func_name".

.unwindinfo prologue end label_state=1

This sub directive designates the end of the prologue for the function associated with label_state=1. In other words, this may designate the end of the prologue of a specific function within a set of nested functions.

.unwindinfo body begin

This sub directive designates the beginning of the body of a function.

.unwindinfo sp_set size=10

This sub directive is used with a stack that is "fixed" rather than "variable". More particularly, this sub directive indicates that the size of the stack (i.e., number of entries in the stack) is 10.

.unwindinfo sp_save r34

This sub directive is used with a stack that is "variable" rather than "fixed". More particularly, this sub directive is used to save the stack pointer to register r34.

.unwindinfo sp_restore

This sub directive is used with a stack that is "variable" rather than "fixed". More particularly, this sub directive is used to restore the stack pointer.

.unwindinfo save pfs r41

This sub directive is used to save the contents of the register "pfs" to register r41.

.unwindinfo spill spillbase=4

This sub directive is used to indicate that spilling is to be performed to a memory location specified by a relative offset of 4 to the previous stack pointer.

.unwindinfo spill f29

This sub directive is used to indicate that spilling is to be performed from register f29, which is a floating point register.

Figure 4:
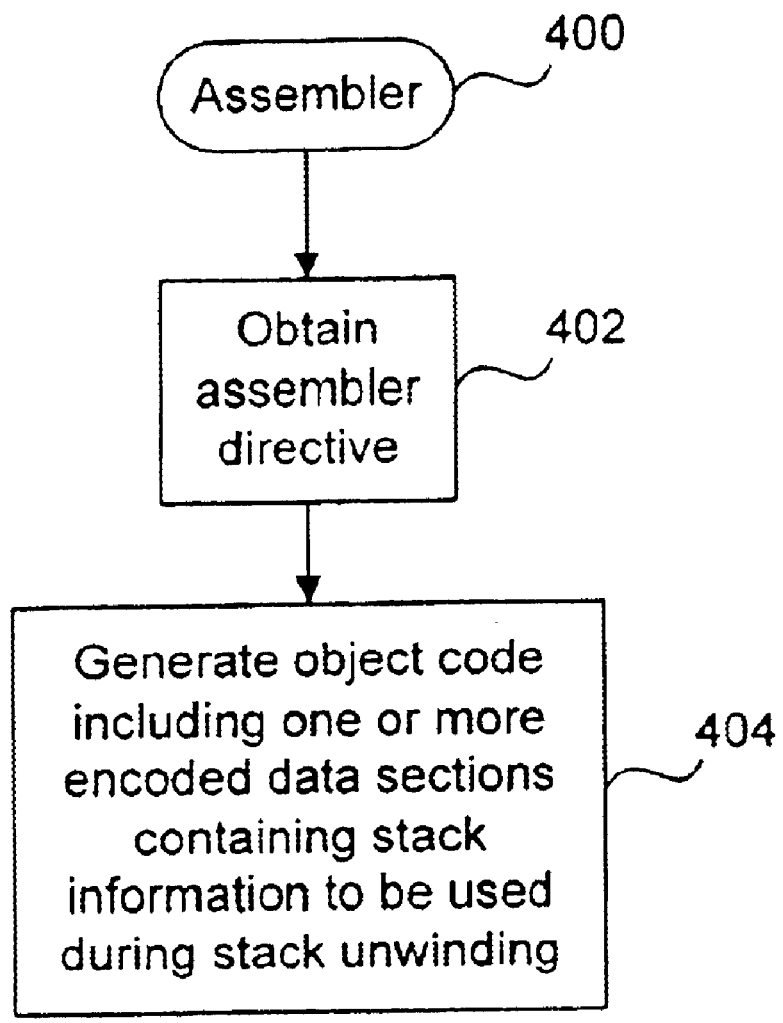
FIG. 4 is a process flow diagram illustrating a method of assembling assembly code such as that generated according to the method illustrated in FIG. 2 to produce encoded data sections within the object file containing stack information for performing stack unwinding by a stack unwinder.

Once assembler directives and sub directives are generated (e.g., by a compiler), an assembler can generate one or more encoded data sections in the object file that contain stack information to be used for stack unwinding. FIG. 4 is a process flow diagram illustrating a method of assembling assembly code such as that generated according to the method illustrated in FIG. 2 to produce an object file that contains encoded data sections for use by a stack unwinder. As shown at block 402, an assembler directive such as that generated according to the method described above with reference to FIG. 2 is obtained. Object code and encoded data sections for the assembler directive are then generated at block 404.

Through the use of the present invention, assembler directives may be generated by a compiler. In this manner, an assembler may be directed to generate object code with encoded data sections to be used by a stack unwinder. Since the assembler directives are in human readable format, an assembly programmer may easily record assembly instructions for performing stack unwinding. Similarly, a compiler may generate assembly code without requiring detailed information regarding the encoded data sections required to perform stack unwinding.

Figure 5:
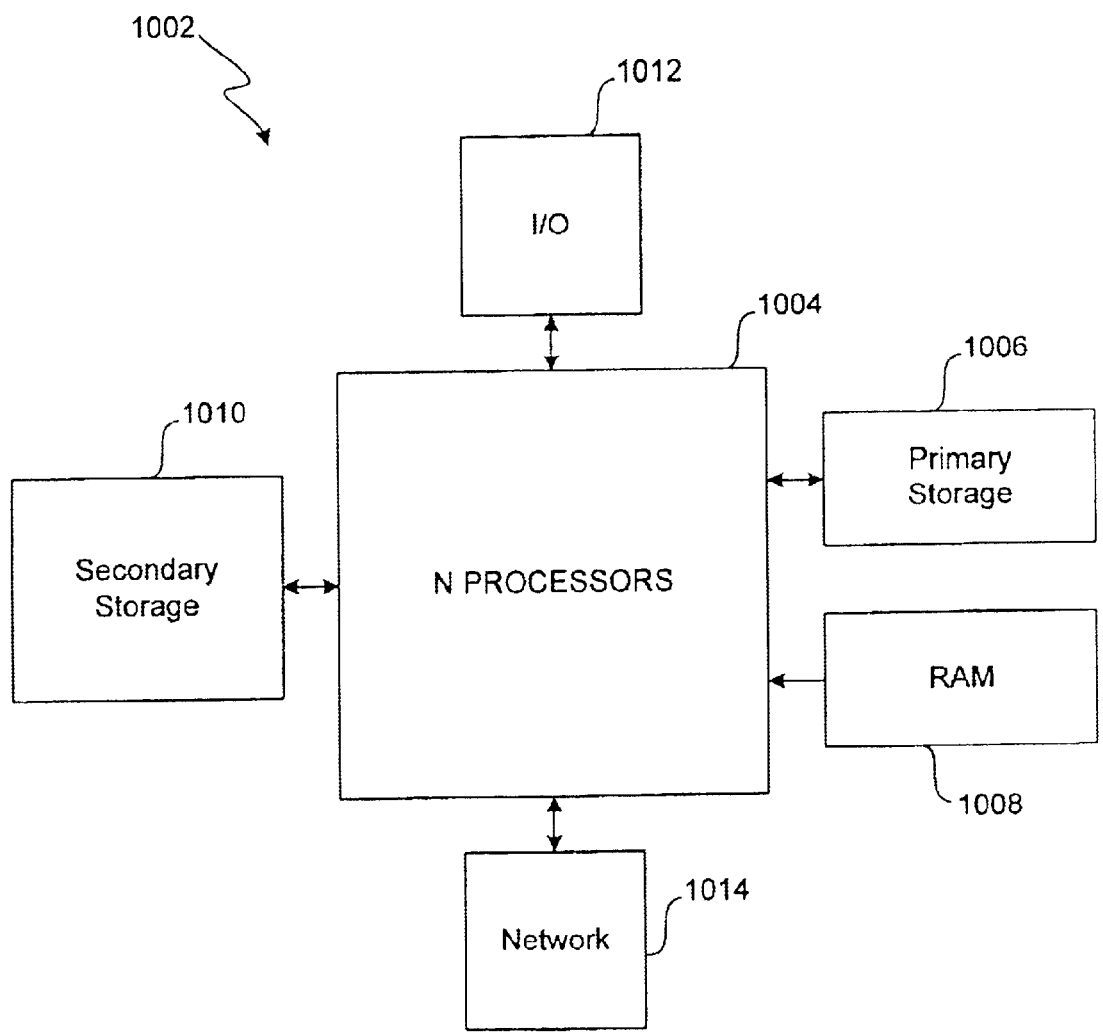
FIG. 5 is a block diagram illustrating a typical, general-purpose computer system suitable for implementing the present invention.

The present invention may be implemented on any suitable computer system. FIG. 5 is a block diagram illustrating a typical, general-purpose computer system suitable for implementing the present invention. Computer system 1030 or, more specifically, CPUs 1032, may be arranged to support a virtual machine, as will be appreciated by those skilled in the art. The computer system 1002 includes any number of processors 1004 (also referred to as central processing units, or CPUs) that may be coupled to memory devices including primary storage device 1006 (typically a read only memory, or ROM) and primary storage device 1008 (typically a random access memory, or RAM). As is well known in the art, ROM acts to transfer data and instructions uni-directionally to the CPUs 1004, while RAM is used typically to transfer data and instructions in a bi-directional manner. Both the primary storage devices 1006, 1008 may include any suitable computer-readable media. The CPUs 1004 may generally include any number of processors.

A secondary storage medium 1010, which is typically a mass memory device, may also be coupled bi-directionally to CPUs 1004 and provides additional data storage capacity. The mass memory device 1010 is a computer-readable medium that may be used to store programs including computer code, data, and the like. Typically, the mass memory device 1010 is a storage medium such as a hard disk which is generally slower than primary storage devices 1006, 1008.

The CPUs 1004 may also be coupled to one or more input/output devices 1012 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1004 optionally may be coupled to a computer or telecommunications network, e.g., an internet network or an intranet network, using a network connection as shown generally at 1014. With such a network connection, it is contemplated that the CPUs 1004 might receive information from the network, or might output information to the network in the course of performing the above-described method steps. Such information, which is often represented as a sequence of instructions to be executed using the CPUs 1004, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being applicable to systems in which stack unwind functionality is provided through the generation of assembly code including stack unwind assembler directives such as those described above. However, the above-described assembler directives are illustrative only. Therefore, it should be understood that other assembler directives may be implemented. Thus, different sub directives and categories of sub directives may be implemented. In addition, it is important to note that the categories of sub directives are merely illustrative and are provided solely to illustrate the type of sub directives that are generated as well as the information that is preferably provided in each of the sub directives. Moreover, different implementations of the sub directives set forth above are also contemplated. Accordingly, the present embodiments are to be considered as illustrative and not restrictive, and the invention is not to be limited to the details given herein, but may be modified within the scope and equivalents of the appended claims.

What is claimed is:

1. In a compiler, a method of generating assembly code to aid in stack unwinding of a memory stack, the method comprising:

obtaining at least one source code line; and generating assembly code for the at least one more source code line, the assembly code including at least one stack unwind assembler directive, each of the stack unwind assembler directives having at least one associated stack unwind sub directive, each stack unwind assembler directive being adapted for indicating to an assembler that at least one encoded data section containing information to be used during stack unwinding is to be generated in an object file from the at least one associated stack unwind sub directive, thereby enabling the assembler to generate the at least one encoded data section to be used during stack unwinding, wherein each stack unwind assembler directive is a human readable indicator indicating to the assembler that associated sub directives are related to stack unwinding, wherein the stack unwind assembler directive does not specify a function to be performed during stack unwinding.

2. The method as recited in claim 1, wherein each stack unwind sub directive indicates a stack unwind operation to be performed.

3. The method as recited in claim 1, wherein each stack unwind sub directive indicates a previously performed stack operation for which unwinding is to be performed.

4. The method as recited in claim 1, wherein each stack unwind sub directive indicates at least one stack operation that are to be reversed by a stack unwind mechanism using the at least one encoded data section.

5. Assembly code generated according to the method of claim 1.

6. In a compiler, a method of generating assembly code to aid stack unwinding of a memory stack, the method comprising:

obtaining at least one source code line; and generating from the at least one source code line a stack unwind assembler directive and an associated stack unwind sub directive, wherein the stack unwind assembler directive indicates that at least one encoded data section containing stack information to be used for stack unwinding of the stack is to be generated by an assembler from the stack unwind sub directive, wherein each stack unwind assembler directive is a human readable indicator indicating to the assembler that associated sub directives are related to stack unwinding, wherein the stack unwind assembler directive does not specify a function to be performed during stack unwinding.

7. In a compiler, a method of generating assembly code to aid stack unwinding from a set of source code, the method comprising:

generating a stack unwind assembler directive; and generating a stack unwind sub directive, wherein the stack unwind assembler directive indicates that at least one more encoded data section containing stack information to be used for unwinding of a stack is to be generated by an assembler from the stack unwind sub directive, wherein each stack unwind assembler directive is a human readable indicator indicating to the assembler that associated sub directives are related to stack unwinding, wherein the stack unwind assembler directive does not specify a function to be performed during stack unwinding.

8. The method as recited in claim 7, wherein the stack unwind sub directive indicates a region operation designating one or more portions of a function.

9. The method as recited in claim 8, wherein the region operation designates a prologue region of a function or a body region of a function.

10. The method as recited in claim 7, wherein the stack unwind sub directive indicates which registers have been saved prior to a function call.

11. The method as recited in claim 7, wherein the stack unwind sub directive indicates whether the stack has a fixed size or a variable size.

12. The method as recited in claim 7, wherein the stack unwind sub directive indicates a number of entries in the stack.

13. The method as recited in claim 7, wherein the stack unwind sub directive indicates whether a function being called has a fixed number of arguments or a variable number of arguments.

14. The method as recited in claim 11, wherein when the stack has a variable size, the stack unwind sub directive further indicates that a stack pointer is saved.

15. The method as recited in claim 11, wherein when the stack has a variable size, the stack unwind sub directive further indicates that a stack pointer is restored.

16. The method as recited in claim 7, wherein the stack unwind sub directive indicates a source register from which data is to be obtained.

17. The method as recited in claim 16, wherein the stack unwind sub directive further indicates a destination register or destination memory location to which the obtained data is to be saved.

18. The method as recited in claim 17, wherein the destination memory location is indicated through an offset from a stack pointer or previous stack pointer.

19. The method as recited in claim 7, wherein the stack unwind sub directive indicates a memory location or first register to which contents of a second register is to be spilled.

20. The method as recited in claim 19, wherein the memory location is specified relative to a stack pointer or previous stack pointer.

21. The method as recited in claim 19, wherein the second register is of type branch, floating point, or general purpose.

22. The method as recited in claim 19, wherein the stack unwind sub directive indicates multiple destination registers to which contents of one or more source registers are to be spilled.

23. A computer-readable medium for generating assembly code for stack unwinding of a memory stack, comprising:

instructions for obtaining at least one source code line; and instructions for generating from the at least one source code line a stack unwind assembler directive and an associated stack unwind sub directive, wherein the stack unwind assembler directive indicates that at least one encoded data section containing information to be accessed during stack unwinding of the stack is to be generated by an assembler from the stack unwind sub directive, wherein each stack unwind assembler directive is a human readable indicator indicating to the assembler that associated sub directives are related to stack unwinding, wherein the stack unwind assembler directive does not specify a function to be performed during stack unwinding.

24. An apparatus for generating assembly code for stack unwinding of a memory stack, comprising:

a processor; and a memory, at least one of the processor and the memory being adapted for:

obtaining at least one source code line; and generating from the at least one source code line a stack unwind assembler directive and an associated stack unwind sub directive, wherein the stack unwind assembler directive indicates that at least one encoded data section containing stack information to be used to perform stack unwinding of the stack is to be generated by an assembler from the stack unwind sub directive, wherein each stack unwind assembler directive is a human readable indicator indicating to the assembler that associated sub directives are related to stack unwinding, wherein the stack unwind assembler directive does not specify a function to be performed during stack unwinding.

25. An apparatus for generating assembly code for stack unwinding of a memory stack, comprising:

means for obtaining at least one source code line; and means for generating from the at least one source code line a stack unwind assembler directive and an associated stack unwind sub directive, wherein the stack unwind assembler directive indicates that at least one encoded data section containing information to be used for stack unwinding of the stack is to be generated by an assembler from the stack unwind sub directive, wherein each stack unwind assembler directive is a human readable indicator indicating to the assembler that associated sub directives are related to stack unwinding, wherein the stack unwind assembler directive does not specify a function to be performed during stack unwinding.

26. In an assembler, a method of generating object code from assembler stack unwind directives, the method comprising:

receiving a stack unwind assembler directive having at least one associated stack unwind sub directive, wherein the stack unwind assembler directive indicates to the assembler that at least one encoded data section containing information for implementing stack unwinding is to be generated from the at least one associated stack unwind sub directive; and generating at least one encoded data section containing stack information to implement a stack unwind feature designated by the at least one stack unwind sub directive, wherein each stack unwind assembler directive is a human readable indicator indicating to the assembler that associated sub directives are related to stack unwinding, wherein the stack unwind assembler directive does not specify a function to be performed during stack unwinding.

27. The method as recited in claim 26, wherein generating at least one encoded data section containing information to implement the stack unwind feature designated by the at least one stack unwind sub directive comprises:

generating at least one encoded data section containing information to reverse stack operations previously performed as indicated by the at least one stack unwind sub directive.

28. The method of claim 1, wherein each stack unwind assembler directive is the same stack unwind assembler directive.

29. The method as recited in claim 1, wherein each stack unwind assembler directive is only an indicator indicating to the assembler that associated sub directives are related to stack unwinding.

30. The method as recited in claim 1, wherein each stack unwind assembler directive does not direct the assembler to perform a function related to stack unwinding.

31. The method as recited in claim 1, wherein each sub directive directs the assembler to perform a function related to stack unwinding.

32. The method as recited in claim 1, wherein each stack unwind assembler directive is not a jump instruction.

* * * * *

UNITED STATES PATENT AND TRADEMARK OFFICE
CERTIFICATE OF CORRECTION

PATENT NO. : 6,892,379 B2
DATED : May 10, 2005
INVENTOR(S) : Alfred J. Huang

It is certified that error appears in the above-identified patent and that said Letters Patent is hereby corrected as shown below:

Column 5,
Line 31, change "Ic" to -- 1c --.

Column 7,
Line 62, change "one more source" to -- one source --.

Column 8,
Line 47, change "more encoded data" to -- encoded data --.

Signed and Sealed this

Twenty-third Day of August, 2005

JON W. DUDAS
*Director of the United States Patent and Trademark Office*